United States Patent
Yoshitoku et al.

(10) Patent No.: US 7,592,058 B2
(45) Date of Patent: *Sep. 22, 2009

(54) OPTICAL RECORDING MEDIUM

(75) Inventors: Daisuke Yoshitoku, Tokyo (JP); Koji Mishima, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/698,927

(22) Filed: Jan. 29, 2007

(65) Prior Publication Data

US 2007/0178270 A1  Aug. 2, 2007

(30) Foreign Application Priority Data

Jan. 31, 2006  (JP) .............................. 2006-023866

(51) Int. Cl.
  *B32B 3/02*  (2006.01)
(52) U.S. Cl. ................................ 428/64.4; 430/270.12
(58) Field of Classification Search ................ 428/64.1, 428/64.4; 430/270.12
  See application file for complete search history.

(56) References Cited

U.S. PATENT DOCUMENTS

| 5,585,158 | A | * | 12/1996 | Raychaudhuri et al. | .... 428/64.1 |
| 5,972,458 | A | * | 10/1999 | Raychaudhuri et al. | .... 428/64.1 |
| 6,153,063 | A | * | 11/2000 | Yamada et al. | ......... 204/192.22 |
| 2005/0237894 | A1 | * | 10/2005 | Mishima et al. | ................ 369/94 |
| 2005/0244753 | A1 | * | 11/2005 | Mishima et al. | ......... 430/270.12 |
| 2006/0222810 | A1 | * | 10/2006 | Hayashi et al. | ............. 428/64.4 |
| 2007/0178270 | A1 | * | 8/2007 | Yoshitoku et al. | ........... 428/64.1 |
| 2007/0202291 | A1 | * | 8/2007 | Mishima et al. | ............. 428/64.4 |

FOREIGN PATENT DOCUMENTS

| JP |  | 02219689 | A | * | 9/1990 |
| JP | A | 10-334507 |  |  | 12/1998 |
| JP | A | 2003-48375 |  |  | 2/2003 |
| JP |  | 2006116948 | A | * | 5/2006 |

* cited by examiner

*Primary Examiner*—Elizabeth Mulvaney
(74) *Attorney, Agent, or Firm*—Oliff & Berridge, PLC

(57) ABSTRACT

An optical recording medium with a high productivity is provided which can certainly record/reproduce data even when a blue or blue-violet laser beam is used as an irradiation light. An optical recording medium has a substrate and a recording layer. The recording layer includes a recording portion and a coating portion. The recording portion and the coating portion are all made substantially from Bi and O. The ratio of the number of O atoms to the total number of Bi atoms and O atoms of the coating portion is less than that of the recording portion. The ratio of the number of O atoms of the recording portion is in the range of from 62% to 77%. The ratio of the number of O atoms to the total number of Bi atoms and O atoms of the coating portion is in the range of from 60% to 70%.

8 Claims, 5 Drawing Sheets

OPTICAL RECORDING MEDIUM

BACKGROUND OF THE INVENTION

1. Field of the Invention

The present invention relates to an optical recording medium in which a recording layer optically changes to record data when a blue or blue-violet laser beam is irradiated thereon.

2. Description of the Related Art

Optical recording media such as CDs (Compact Discs) and DVDs (Digital Versatile Discs) are widely utilized as information recording media. Furthermore, in recent years optical recording media which utilize a blue or blue-violet laser beam of a wavelength of 405 nm (or in the range of 380 to 450 nm) as the irradiating light so that they can record more data with higher density are becoming increasingly popular.

Optical recording media are roughly categorized as a ROM (Read Only Memory)-type which can neither record nor rewrite data, an R (Recordable)-type which can record data only once, and an RW (Rewritable)-type which can rewrite data. The features that are particularly important regarding the recording layer of an R-type optical recording medium are that its optical properties change when irradiated with laser beam light, and, moreover, its quality hardly deteriorates even after being stored for a long period of time, providing superior durability. Organic dyes have been conventionally used as materials for the recording layer of an R-type optical recording medium. These conventional organic dyes have a tendency to absorb less ultraviolet light or visible light of a short wavelength such as blue or blue-violet, which are apt to promote chemical reactions, and this characteristic has contributed to the inhibition of any deterioration.

However, since conventional organic dyes do not absorb light of a short wavelength such as blue or blue-violet light very well, if a blue or blue-violet laser beam is used as the irradiation light, there is insufficient change in the optical properties of the recording layer to allow for the satisfactory recording of any data. Furthermore, it has been difficult to develop organic dyes which produce enough change in the optical properties of the recording layer in the case where a blue or blue-violet laser beam is used as the irradiation light.

On the other hand, R-type optical recording media in which inorganic materials such as oxides, and the like of, for example, Bi, Mo, Cu, Ag or Pd are used as the materials for the recording layer are known (for example, see Japanese Patent Laid-open Publication No. 2003-48375 and Japanese Patent Laid-open Publication No. Hei 10-334507). Some of these inorganic materials are capable of producing changes in the optical properties even if a blue or blue-violet laser beam is used as the irradiation light, but it was difficult to ensure that enough change in the optical properties is obtained in order to record data.

In order to overcome this difficulty, it is possible to improve the optical properties of the recording layer by forming dielectric layers, or the like on both sides of the recording layer.

However, formation of dielectric layers or the like would not only complicate the structure of an optical recording medium but also increase the number of production steps, thereby lowering productivity and increasing the cost of manufacturing the optical recording media. Furthermore, in the case where recording layers, dielectric layers or the like of inorganic materials are to be formed, an expensive vacuum deposition apparatus such as a sputtering apparatus has to be used. In order to form recording layers, dielectric layers, or the like made of different materials, a plurality of vacuum deposition apparatuses corresponding to the number of differing materials would need to be provided, thereby increasing the cost of manufacturing optical recording media even further.

SUMMARY OF THE INVENTION

In view of the foregoing problems, various exemplary embodiments of the present invention provide optical recording media with high productivity that can certainly record/reproduce data even when a blue or blue-violet laser beam is used as the irradiation light.

In order to achieve the aforementioned object, various exemplary embodiments of the present invention provide an optical recording medium, in which the recording layer includes a recording portion and a coating portion which coats at least one side of the recording portion in a thickness direction, both the recording portion and the coating portion are made substantially from Bi and O, a ratio of number of O atoms to a total number of Bi atoms and O atoms of the coating portion is less than that of the recording portion, a ratio of number of O atoms to a total number of Bi atoms and O atoms of the recording portion is in the range of from 62% to 77%, and the ratio of the number of O atoms to the total number of Bi atoms and O atoms of the coating portion is in the range of from 60% to 70%.

In course of conceiving the present invention, the inventors found that, as shown by the curve designated by the reference letter E in FIG. 7, the 8T C/N value of the recording layer which was made substantially from Bi and O became significantly large when the ratio of the number of O atoms to the total number of Bi atoms and O atoms became 62% or more, and large 8T C/N values could be obtained even if a blue or blue-violet laser beam was used as the irradiation light. Incidentally, the 8T C/N value reaches a maximum when the ratio of the number of O atoms to the total number of Bi atoms and O atoms is approximately 70%.

Furthermore, the inventors also found that, as shown by the curve designated by the reference letter F in FIG. 7, large reflectivity values of the recording layer which was made substantially from Bi and O could be also obtained when a ratio of the number of O atoms to the total number of Bi atoms and O atoms was 60% or more. Incidentally, the reflectivity reaches a maximum when the ratio of the number of O atoms to the total number of Bi atoms and O atoms is approximately 67% (this is less than approximately 70% which is the ratio of the number of O atoms to the total number of Bi atoms and O atoms for the maximum 8T C/N value).

In order to ensure that excellent optical properties are realized, it is important that, in addition to the 8T C/N values and the reflectivity values being large, changes in the 8T C/N values and the reflectivity values are limited to small variations only, even if the compositional ratios of the constituent elements of the recording layer change slightly, so that quality remains consistent.

However, as shown in FIG. 7, the change in reflectivity of the recording layer which is made substantially from Bi and O corresponding to the change in the ratio of the number of O atoms to the total number of Bi atoms and O atoms is large. For example, for the ratio of the number of O atoms to the total number of Bi atoms and O atoms being 67% or more, the reflectivity drops sharply as the ratio of the number of O atoms increases. Furthermore, the ratio of the number of O atoms to the total number of Bi atoms and O atoms for which the 8T C/N value reaches a maximum is larger than the ratio of the number of O atoms to the total number of Bi atoms and O atoms for which the reflectivity value reaches a maximum, and this difference is large. Therefore, it would be difficult to realize both an excellent 8T C/N value and an excellent reflectivity value simultaneously.

Consequently, the inventors diligently continued making examinations and found that by configuring the recording layer to include a recording portion and a coating portion, both of which are made substantially from Bi and O, making the ratio of the number of O atoms to the total number of Bi atoms and O atoms of the coating portion to be less than that of the recording portion, making the ratio of the number of O atoms to the total number of Bi atoms and O atoms of the recording portion to be in the range of from 62% to 77%, and making the ratio of the number of O atoms to the total number of Bi atoms and O atoms of the coating portion to be in the range of from 60% to 70%, sufficiently large values are obtained for both the 8T C/N and the reflectivity, and, moreover, changes in the reflectivity values along with changes in the compositional ratios of constituent elements of the recording layer are limited to small variations only.

Although reasons why these effects are obtained are not necessarily apparent, it is considered that the coating portion, which has a relatively small ratio of the number of O atoms to the total number of Bi atoms and O atoms, mainly contributes to the reflectivity and the recording portion, which has a relatively large ratio of the number of O atoms to the total number of Bi atoms and O atoms, mainly contributes to the 8T C/N value, thereby realizing both an excellent 8T C/N value and an excellent reflectivity value simultaneously.

Furthermore, since, in this optical recording medium, both the recording portion and the coating portion are made substantially from Bi and O, the recording portion and the coating portion can be formed by deposition in a common vacuum deposition apparatus by changing deposition conditions, and this contributes to a reduction in manufacturing costs.

Accordingly, various exemplary embodiments of this invention provide an optical recording medium comprising a substrate; and a recording layer formed over the substrate, wherein the recording layer includes a recording portion, and a coating portion which coats at least one side of the recording portion in a direction of thickness; the recording portion and the coating portion are both made substantially from Bi and O; a ratio of number of O atoms to a total number of Bi atoms and O atoms of the coating portion is less than that of the recording portion; a ratio of number of O atoms to a total number of Bi atoms and O atoms of the recording portion is in a range of from 62% to 77%; and the ratio of the number of O atoms to the total number of Bi atoms and O atoms of the coating portion is in a range of from 60% to 70%.

According to the various exemplary embodiments of the present invention, optical recording media of high productivity that can record/reproduce data with certainty even when, for example, a blue or blue-violet laser beam is used as the irradiation light can be obtained.

DETAILED DESCRIPTION OF THE PREFERRED EMBODIMENTS

Hereinafter, preferred exemplary embodiments for carrying out the present invention will be described in detail with reference to drawings.

Figure 1:
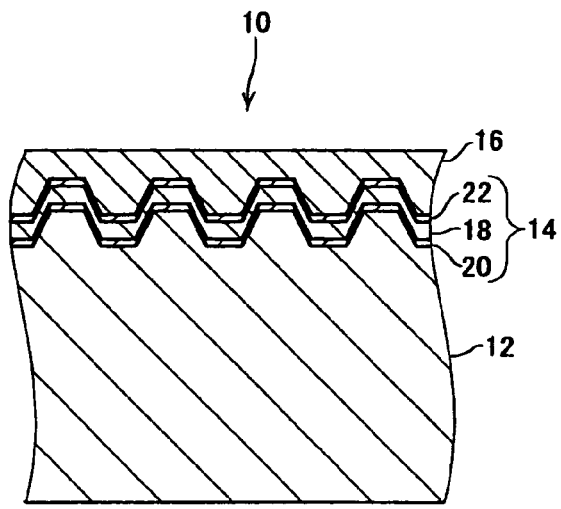
FIG. 1 is a cross sectional side view schematically showing the structure of an optical recording medium according to a first exemplary embodiment of the present invention.

As shown in FIG. 1, an optical recording medium 10 according to a first exemplary embodiment of the present invention is an R-type optical disc, in which a recording layer 14 and a cover layer 16 are formed, in this order, over one side of a substrate 12 and optical properties of the recording layer 14 change when the recording laser beam is irradiated. The optical recording medium 10 is characterized by the structure of the recording layer 14. The optical recording medium 10 is a disc which has an outer diameter of approximately 120 mm and a thickness of approximately 1.2 mm.

The substrate 12 is approximately 1.1 mm in thickness and is provided with tracking grooves on a surface thereof on the recording layer 14's side. Examples of the materials that can be used for the substrate 12 include polycarbonate resin, acrylic resin, epoxy resin, polystyrene resin, polyethylene resin, polypropylene resin, silicone resin, fluorocarbon resin, ABS resin, urethane resin, and the like.

The recording layer 14 includes a recording portion 18, a first coating portion 20 which coats the recording portion 18 on the substrate 12 side thereof in the direction of thickness, and a second coating portion 22 which coats the recording portion 18 on the cover layer 16 side. The recording layer 14 is formed in a concavo-convex pattern following the concavo-convex pattern of the substrate 12. The recording portion 18, the first coating portion 20, and the second coating portion 22 are all made from Bi and O, and the ratio of the number of O atoms to the total number of Bi atoms and O atoms of the first coating portion 20 and the second coating portion 22 is less than that of the recording portion 18. The ratio of the number of O atoms to the total number of Bi atoms and O atoms of the recording portion 18 is in the range of from 62 to 77%. On the other hand, the ratio of the number of O atoms to the total number of Bi atoms and O atoms of the first coating portion 20 and the second coating portion 22 is in the range of 60 to 70%.

The phrase "made substantially from Bi and O" means that the ratio of the total number of Bi atoms and O atoms to the total number of all atoms constituting the recording portion 18 is 80% or more. It is preferable that the ratio of the total number of Bi atoms and O atoms to the total number of all atoms constituting the recording portion 18 is 90% or more. Furthermore, it is preferable that the recording portion 18 is thicker than both the first coating portion 20 and the second coating portion 22 in order to obtain excellent optical properties. Incidentally, one of the first coating portion 20 and the second coating portion 22 or even both coating portions may be configured to be thicker than the recording portion 18 provided that sufficient changes in the optical properties of the recording layer can be obtained by irradiation of the recording laser beam.

The cover layer 16 is approximately 100 μm in thickness. Examples of the materials for the cover layer 16 include transparent energy ray curable resins such as ultraviolet curable acrylic resin, ultraviolet curable epoxy resin and the like. The term "energy ray" is a generic term for electromagnetic waves or particle beams such as ultraviolet rays, electron beams and the like, which have the property of curing certain types of resin in a fluid state. It should be noted that a transparent film may be used as the material for the cover layer 16.

A description will now be given of the operation of the optical recording medium 10.

As described above, the optical recording medium 10 has the recording layer 14 made from Bi and O, the ratio of the number of O atoms to the total number of Bi atoms and O atoms of the first coating portion 20 and the second coating portion 22 is less than that of the recording portion 18, and the ratio of the number of O atoms to the total number Bi atoms and O atoms of the recording portion 18 is in the range of from 62% to 77%. Furthermore, the ratio of the number of O atoms to the total number of Bi atoms and O atoms of the first coating portion 20 and the second coating portion 22 is in the range of 60% to 70%. Accordingly, sufficient changes in the optical properties can be obtained even when a blue or blue-violet laser beam is used as the irradiation light so that data can be recorded/reproduced.

Figure 5:
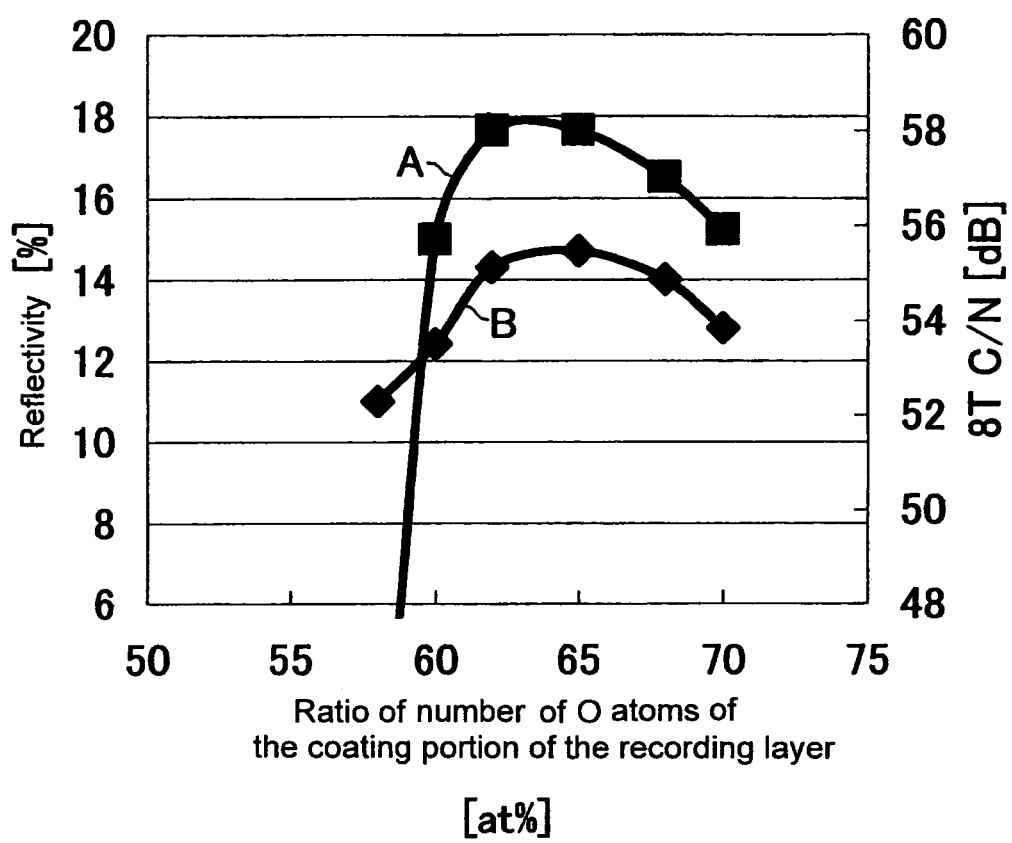
FIG. 5 is a graph showing a relationship between the reflectivity, 8T C/N values and the ratio of the number of O atoms to the total number of Bi atoms and O atoms of the coating portion of the recording layer for some samples in Working Example 1 of the present invention and Comparative Example 2.
Figure 6:
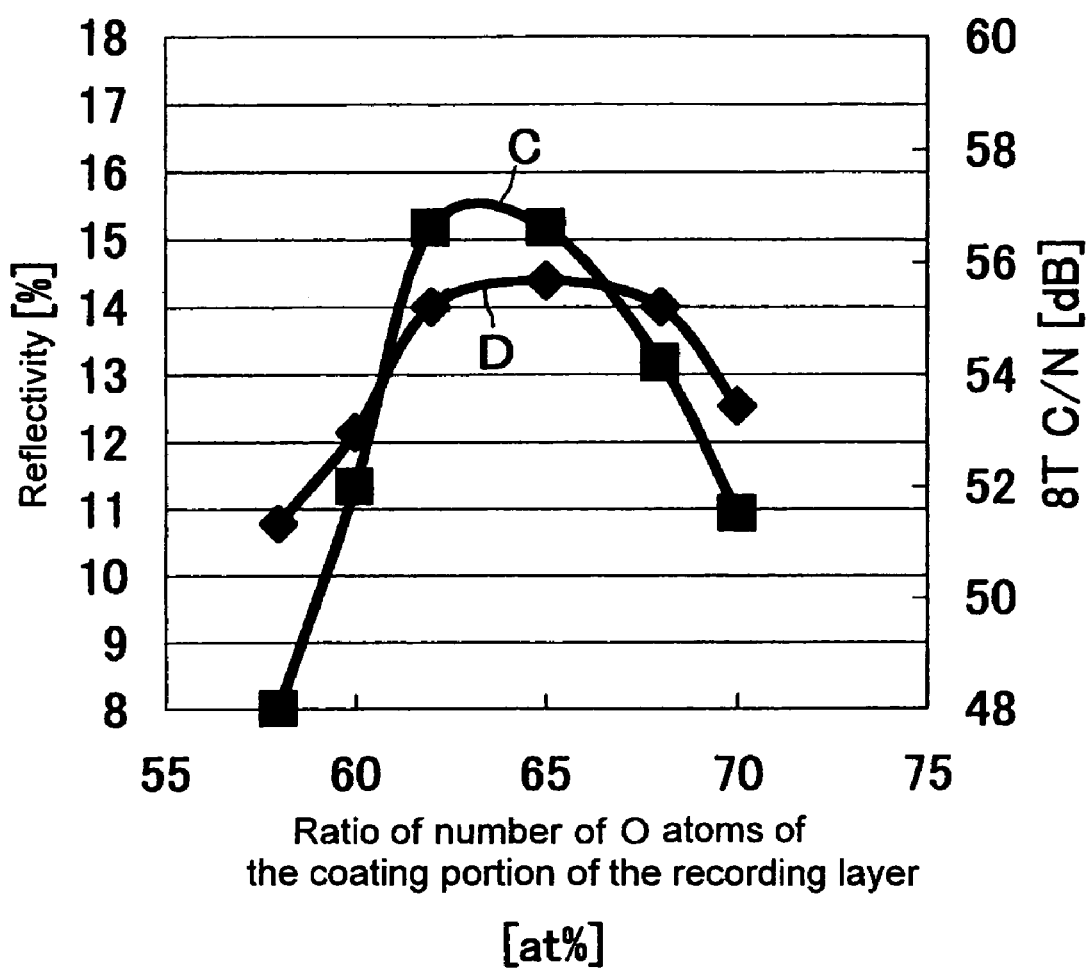
FIG. 6 is a graph showing a relationship between the reflectivity, 8T C/N values and the ratio of the number of O atoms to the total number of Bi atoms and O atoms of the coating portion of the recording layer for some samples in Working Example 3 of the present invention and Comparative Example 2.

In particular, in the optical recording medium 10, as shown in FIGS. 5 and 6, sufficiently large values can be obtained for both the 8T C/N value represented by curves designated by the reference letters A and C and the reflectivity values represented by curves designated by the reference letters B and D.

Furthermore, since, in the optical recording medium 10, changes in the values of 8T C/N and reflectivity along with the changes in the compositional ratios of the constituent elements of the recording layer 14 are limited to small variations, the constant quality is ensured.

It should be noted that it is considered that, in the recording layer 14, the recording portion 18 mainly contributes to the 8T C/N value so that it carries data to be recorded. However, the first coating portion 20 and the second coating portion 22 can also carry data to be recorded, depending on the compositional ratios of Bi and O.

Furthermore, since the recording portion 18, the first coating portion 20, and the second coating portion 22 which constitute the recording layer 14 are made from common constituent elements, deposition of the recording layer 14 can be conducted easily with high productivity, as will be described later. It should be noted that, from the viewpoint of productivity, it is preferable that both the first coating portion 20 and the second coating portion 22 have a thickness of 30 nm or less, and more preferably, 15 nm or less.

Figure 2:
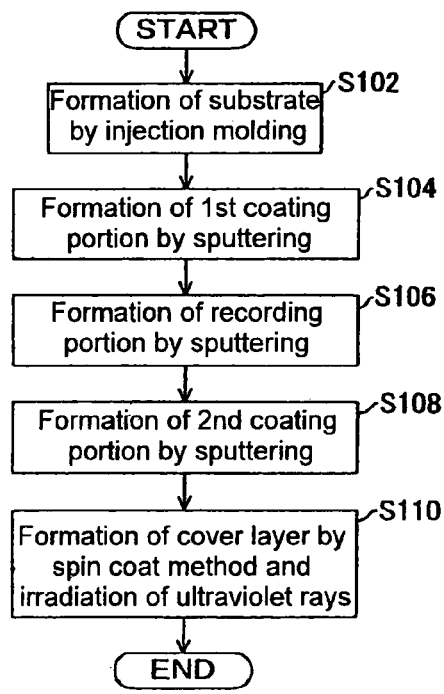
FIG. 2 is a flow chart showing an outline of manufacturing steps of the optical recording medium.

An example of a manufacturing method for the optical recording medium 10 will now be described with reference to the flow chart shown in FIG. 2.

First, the disc-shaped substrate 12 with an outer diameter of approximately 120 mm and a thickness of approximately 1.1 mm is formed by injection molding (S102). During this process, a concavo-convex pattern of grooves is formed on one side of the substrate 12.

Next, the first coating portion 20 is then formed on the surface of the substrate 12 where the grooves have been formed (S104). Specifically, the substrate 12 is placed in the chamber of a sputtering apparatus where the Bi target has been provided, and $O_2$ gas and a sputtering gas such as Ar, Xe, or the like are supplied into the chamber so that they are made to collide against the Bi target. Then, particles of Bi scatter, react with the $O_2$ within the chamber, and are deposited on the substrate 12 while being oxidized. This process allows the deposition of the first coating portion 20 with an almost uniform thickness following the concavo-convex pattern of the groove. By controlling sputtering conditions (deposition conditions) such as the supply flow of the $O_2$ gas and deposition power, the ratios of Bi and o within the first coating portion 20 can be adjusted. It should be noted that although it is preferable that the recording layer 14 consists mainly of Bi and O, other atoms or compounds may be included provided that they are present in minute quantities. It is preferable that the ratios of other such atoms and compounds are 20 at % or less of all atoms constituting the recording layer 14. When the prescribed thickness of the first coating portion 20 is obtained, the sputtering is stopped for a period.

Next, the recording portion 18 is formed on the first coating portion 20 (S106). Specifically, the same sputtering apparatus used for the deposition of the aforementioned first coating portion 20 is used, where sputtering conditions such as the supply flow of the $O_2$ gas or deposition power are changed to form the recording portion 18 of the recording layer 14. In order to obtain excellent signal properties, it is preferable that the recording portion 18 has a thickness in the range of from 15 nm to 80 nm. When the prescribed thickness of the recording portion 18 is obtained, the sputtering is stopped for a period.

Next, the second coating portion 22 is formed on the recording portion 18 (S108). Specifically, the same sputtering apparatus used for the deposition of the first coating portion 20 and the recording portion 18 is used, where sputtering conditions such as the supply flow of the $O_2$ gas or deposition power are changed to form the second coating portion 22. When the prescribed thickness of the second coating portion 22 is obtained, the sputtering is stopped, and this concludes the deposition of the recording layer 14 by deposition. It should be noted that it is preferable that the thickness of the recording layer 14 (the total thickness of the recording portion 18, the first coating portion 20 and the second coating portion 22) is in the range of from 16 nm to 120 nm, and more preferably, in the range of from 40 nm to 80 nm.

Finally, the cover layer 16 is spread over the recording layer 14 to a thickness of approximately 100 μm using the spin coat method and cured by energy rays such as ultraviolet rays (S110). It should be noted that a prefabricated film may be glued on the recording layer 14 to serve as the cover layer 16. This completes the manufacture of the optical recording medium 10.

As described above, since the first coating portion 20, the recording portion 18, and the second coating portion 22 all have same constituent elements of Bi and O, they can be deposited in the same sputtering apparatus (a vacuum deposition apparatus) with sputtering conditions being controlled, thereby contributing to both an improvement in productivity and a reduction in manufacturing costs.

Figure 3:
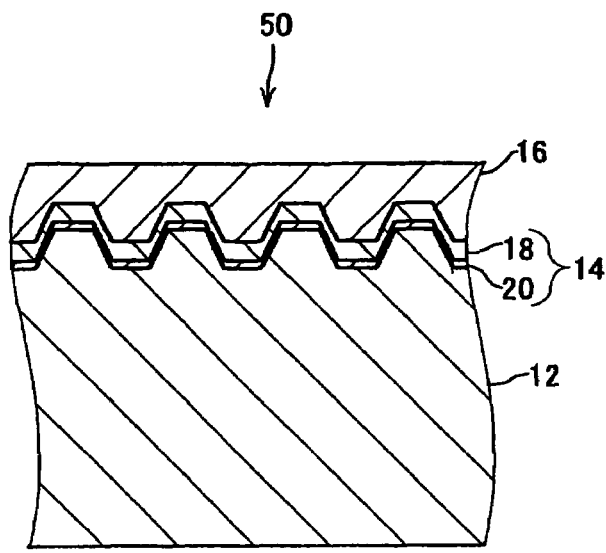
FIG. 3 is a cross sectional side view schematically showing the structure of an optical recording medium according to a second exemplary embodiment of the present invention.
Figure 4:
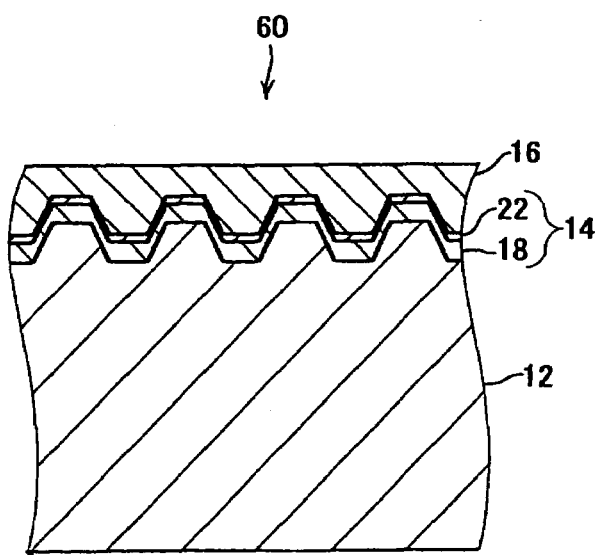
FIG. 4 is a cross sectional side view schematically showing the structure of an optical recording medium according to a third exemplary embodiment of the present invention.

Although, in this first exemplary embodiment, the recording layer 14 is configured such that one side of the recording portion 18 is coated with the first coating portion 20 and the other side with the second coating portion 22, the recording layer 14 may be structured such that only the substrate 12 side of the recording portion 18 is coated with the first coating portion 20 as in the optical recording medium 50 of a second exemplary embodiment of the present invention shown in FIG. 3, or that only the cover layer 16 side of the recording portion 18 is coated with the second coating portion 22 as in the optical recording medium 60 of a third exemplary embodiment of the present invention shown in FIG. 4. These configurations also give certain effects of realizing both an excellent 8T C/N value and an excellent reflectivity value simultaneously and making quality consistent.

Furthermore, although, in the aforementioned first, second and third exemplary embodiments, only the first coating portion 20, the recording portion 18, and the second coating portion 22, all being made of the same constituent elements, are disposed between the substrate 12 and the cover layer 16, a reflecting layer, a dielectric layer and the like, which are made of different constituent elements from those of these portions, may also be provided in addition to these portions. It should be appreciated that the dielectric layer may be deposited on only one side of the recording portion 18 or on both sides thereof.

Furthermore, although in the aforementioned first exemplary embodiment, during the deposition of the recording layer 14, the sputtering is stopped every time the deposition of the first coating portion 20 or the recording portion 18 ends, intermittently depositing the first coating portion 20, the recording portion 18, and the second coating portion 22, it should be appreciated that the first coating portion 20, the recording portion 18, and the second coating portion 22 may be formed by continuous deposition by continuously controlling the deposition conditions. By doing so, the compositional ratios of Bi and O change continuously across the boundaries between the first coating portion 20, the recording portion 18, and the second coating portion 22, which provides an advantage in that exfoliation at the boundaries between the first coating portion 20, the recording portion 18, and the second coating portion 22 becomes less likely. Conversely, if, as in the aforementioned first exemplary embodiment, the first coating portion 20, the recording portion 18, and the second coating portion 22 are intermittently deposited, then the first coating portion 20, the recording portion 18, and the second coating portion 22 will all have accurate compositional ratios of their constituent elements, which can also be an advantage. Selection of which deposition technique is to be employed can be made according to required performances and the like.

Furthermore, although, in the aforementioned first exemplary embodiment, the Bi target is used and an $O_2$ gas is supplied to deposit the first coating portion 20, the recording portion 18, and the second coating portion 22, a $BiO_x$ target may be used in conjunction with a supply of $O_2$ gas to deposit the first coating portion 20, the recording portion 18 and the second coating portion 22.

Also, although, in the aforementioned first exemplary embodiment, the sputtering method is used to deposit the first coating portion 20, the recording portion 18, and the second coating portion 22, other vapor deposition methods such as chemical vapor deposition method, for example, may be used to deposit the first coating portion 20, the recording portion 18, and the second coating portion 22 provided that the compositional ratios of the constituent elements can be controlled in the desired values.

Furthermore, although, in the aforementioned first, second, and third exemplary embodiments, the optical recording medium 10, 50, 60 are a single-layer recording type in which only one recording layer 14 is formed, the exemplary embodiments of the present invention can be applied to optical recording media of a multi-layer recording type in which a plurality of recording layers is formed alternately with spacer layers therebetween.

Also, although, in the aforementioned first, second, and third exemplary embodiments, the optical recording medium 10, 50, 60 are a one-sided recording type in which data can be recorded on only one side of the medium, the exemplary embodiments of the present invention can also be applied to optical recording media of a double-sided recording type in which the recording layer is provided on both sides of the medium.

Furthermore, although, in the aforementioned first, second, and third exemplary embodiments, the optical recording medium 10 is configured such that the cover layer 16 is thinner than the substrate 12, the exemplary embodiments of the present invention can also be applied to optical recording media such as DVDs in which the substrate and the cover layer have the same thickness.

WORKING EXAMPLE 1

Five different samples of the optical recording medium 10, namely, $W_1$ to $W_5$, were prepared, where, as shown in the aforementioned first exemplary embodiment, one side of the recording portion 18 was coated with the first coating portion 20 and the other side with the second coating portion 22; the first coating portion 20, the recording portion 18, and the second coating portion 22 were all made from Bi and O; and the compositional ratios of Bi and O within the first coating portion 20 and the second coating portion 22 were varied among the samples. It should be noted that the compositional ratios of Bi and O within the first coating portion 20 and the second coating portion 22 of the same sample were made equal.

A detailed description of the manufacturing method used was as follows. First, five pieces of substrate 12, each having a thickness of 1.1 mm and a diameter of 120 mm, were prepared from polycarbonate resin by injection molding.

Next, these substrates 12 were put into the sputtering apparatus one by one to deposit the first coating portion 20 with a thickness of approximately 15 nm, the recording portion 18 with a thickness of approximately 20 nm and the second coating portion 22 with a thickness of approximately 10 nm, thereby obtaining a recording layer 14 having a thickness of approximately 45 nm.

In this case, flows of Ar gas and $O_2$ gas were set as shown in Table 1 to control the ratios of Bi and O constituting the first coating portion 20, the recording portion 18, and the second coating portion 22. The deposition power for the Bi target was set at a constant 150 W. Specifically, the first coating portion 20 and the second coating portion 22 were arranged to provide five different ratios such that the ratio of the number of O atoms to the total number of Bi atoms and O atoms differed in the range of from 60% to 70% over the five different samples. On the other hand, the recording portion 18 was arranged such that, for all samples, the ratio of the number of O atoms to the total number of Bi atoms and O atoms would be approximately 72% (or at least in the range of from 62% to 77%).

TABLE 1

|  |  |  | $C_6$ | $W_1$ | $W_2$ | $W_3$ | $W_4$ | $W_5$ | $W_6$ | $C_7$ | $W_7$ | $W_8$ | $W_9$ | $W_{10}$ | $W_{11}$ |
|---|---|---|---|---|---|---|---|---|---|---|---|---|---|---|---|
| First coating portion | Compositional ratio (at %) | O | 58 | 60 | 62 | 65 | 68 | 70 | 60 | 58 | 60 | 62 | 65 | 68 | 70 |
| Second coating portion |  | Bi | 42 | 40 | 38 | 35 | 32 | 30 | 40 | 42 | 40 | 38 | 35 | 32 | 30 |
|  | Gas flow (sccm) | Ar |  |  |  |  |  |  | 50 |  |  |  |  |  |  |
|  |  | $O_2$ | 5 | 10 | 12 | 14 | 16 | 20 | 10 | 5 | 10 | 12 | 14 | 16 | 20 |
| Recording portion | Compositional ratio (at %) | O |  |  |  | 72 |  |  |  | 62 |  |  | 77 |  |  |
|  |  | Bi |  |  |  | 28 |  |  |  | 38 |  |  | 23 |  |  |
|  | Gas flow (sccm) | Ar |  |  |  |  |  |  |  | 50 |  |  |  |  |  |
|  |  | $O_2$ |  |  |  | 25 |  |  |  | 12 |  |  | 50 |  |  |
| Reflectivity(%) |  |  | 11.0 | 12.4 | 14.3 | 14.7 | 14.0 | 12.8 | 14.8 | 10.8 | 12.1 | 14.0 | 14.4 | 14.0 | 12.5 |
| 8T C/N value (dB) |  |  | 42.0 | 55.7 | 58.0 | 58.0 | 57.0 | 55.9 | 50.6 | 48.0 | 52.0 | 56.6 | 56.6 | 54.2 | 51.5 |

Lastly, ultraviolet curable acrylic resin was applied on the second coating portion 22, spreading to a thickness of approximately 100 μm, using the spin coat method, and then cured by irradiation with ultraviolet rays.

For these five different samples $W_1$, $W_2$, $W_3$, $W_4$ and $W_5$ of the optical recording medium 10 thus obtained, the reflectivity values and the 8T C/N values were measured. Specifically, these samples were put into the optical recording medium evaluation apparatus DDU1000 (manufactured by Pulstec Industrial Co., Ltd.) one by one, and then a recording marks of length 8T was formed on the recording layer 14 of each to record data. Conditions were set as follows.

Wavelength of laser beam: 405 nm
Numerical aperture NA of objective lens: 0.85
Modulation method: (1, 7) RLL
Recording linear velocity: 4.9 m/sec
Channel bit length: 0.12 μm
Channel clock: 66 MHz
Recording method: On-groove recording
Reproduction power: 0.7 mW
Intermediate power: 2.0 mW
Base power: 1.0 mW Then, the reflectivity value of the space portion (the portion where the recording mark is not formed) in the recording layer 14 was measured by the aforementioned optical recording medium evaluation apparatus.

Next, the recording mark of length 8T formed on the recording layer 14 was reproduced, and the C/N value of the reproduced signal was measured. For the measurement of the C/N value, a spectrum analyzer XK180 (manufactured by ADVANTEST CORPORATION) was used. Conditions for the reproduction were set as follows.

Wavelength of laser beam: 405 nm
Reproduction power Pr: 0.7 mW
Numerical aperture NA of objective lens: 0.85

Results of the measurement of the reflectivity value and the 8T C/N value for each sample are shown in Table 1 and FIG. 5. FIG. 5 shows a relationship between the ratio of the number of O atoms to the total of number of Bi atoms and O atoms of the first coating portion 20 and the second coating portion 22 and for the results of the measurements of the 8T C/N values and the reflectivity values. In FIG. 5, a curve designated by the reference letter A represents the results of the measurements of the 8T C/N values and a curve designated by the reference letter B represents the results of the measurements of the reflectivity values.

A method for confirming the compositional ratios of the constituent elements within the recording portion 18, the first coating portion 20 and the second coating portion 22 and the thicknesses thereof will now be described.

First, the cover layer 16 is removed, and the recording layer 14 is coated with carbon with a thickness of approximately 20 nm. Then, using the FIB (Focused Ion Beam) method, the recording layer 14 is cut in the thickness direction such that the width in the direction along the surface becomes approximately 70 nm, thus preparing the samples for cross-sectional TEM. Preparation of these samples can be done by, for example, FB2100 (manufactured by Hitachi High-Technologies Corporation), and the like.

By observing with TEM (Transmission Electron Microscope) and analyzing with EDS (Energy-Dispersive x-ray Spectroscopy) the samples thus prepared at multiple locations (in the recording layer 14) in the thickness direction, a profile (a graph obtained by plotting the relationship between locations in the thickness direction and compositional ratios of constituent elements within the sample) for each sample is obtained. When making such measurements, FE-TEM (JEM-2100F: manufactured by JEOL, Ltd.) or FE-STEM (HD2000: manufactured by Hitachi High-Technologies Corporation), for example, can be used. In the profile thus obtained, the ratio of the number of Bi atoms to the total number of Bi atoms and O atoms is almost constant for each of the three domains along the thickness direction corresponding to the recording portion 18, the first coating portion 20 and the second coating portion 22. Moreover, the ratio of the number of Bi atoms to the total number of Bi atoms and O atoms changes drastically in the vicinity of the boundaries between these domains. The boundaries of the recording portion 18, the first coating portion 20, and the second coating portion 22 are judged to be where the compositional ratio of Bi to Bi and O becomes almost equal to an arithmetic mean of the compositional ratios of Bi to Bi and O of the two neighboring domains, and deposition thicknesses thereof can be calculated accordingly.

It should be noted that it is also possible to prepare needle-like samples by cutting the recording layer 14 in the thickness direction using the FIB method in a manner such that the width on the surface on one side of the recording layer 14 is approximately 100 nm (in the direction along that surface) and the width on the surface on the other side is larger and, then, measure the compositional ratios of the constituent elements within the sample at multiple locations (in the recording layer 14) in the thickness direction by TOF-MS (Time Of Flight Mass Spectrometry) which uses APFIM (Atom Probe Focused Ion Beam Microscope). Even in the case where an analysis of the compositional ratio of the number of oxygen is difficult, the compositional ratio of oxygen to Bi and O can be calculated by measuring the compositional ratios of elements other than oxygen as described above.

WORKING EXAMPLE 2

In contrast to the aforementioned Working Example 1, a single sample $W_6$ was prepared, where the ratio of the number of O atoms to the total number of Bi atoms and O atoms of the recording portion 18 was approximately 62% (the lower limit of the range of from 62% to 77%) and the ratio of the number of O atoms to the total number of Bi atoms and O atoms of the first coating portion 20 and the second coating portion 22 was 60%. The other features of the structure of sample $W_6$ were the same as those of samples $W_1$ to $W_5$ in the aforementioned Working Example 1.

Likewise, the reflectivity value and the 8T C/N value were measured for sample $W_6$ in the same manner detailed in the aforementioned Working Example 1. The structure of the sample $W_6$, the deposition conditions for the first coating portion 20 and the second coating portion 22 of the sample $W_6$, and the results of measurement of the reflectivity value and the 8T C/N value are shown together in Table 1.

WORKING EXAMPLE 3

In contrast to the aforementioned Working Example 1, five different samples $W_7$ to $W_{11}$ were prepared, where the ratio of the number of O atoms to the total number of Bi atoms and O atoms of the recording portion 18 was approximately 77% (the upper limit of the range of from 62% to 77%) and the ratio of the number of O atoms to the total number of Bi atoms and O atoms of the first coating portion 20 and the second coating portion 22 was in the range of from 60% to 70%. The other features of the structure of samples $W_7$ to $W_{11}$ were the same as those of samples $W_1$ to $W_5$ in the aforementioned Working Example 1.

Likewise, the reflectivity value and the 8T C/N value were measured for each of the samples $W_7$ to $W_{11}$ in the same manner detained in the aforementioned Working Example 1. The structure of the samples $W_7$ to $W_{11}$, the deposition conditions for the first coating portion 20 and the second coating portion 22 of the samples $W_7$ to $W_{11}$, and the results of the measurements of the reflectivity values and the 8T C/N values are shown in Table 1 and FIG. 6. In FIG. 6, a curve designated by reference letter C represents the results of the measurements of the 8T C/N values, and a curve designated by reference letter D represents the results of the measurements of the reflectivity values.

COMPARATIVE EXAMPLE 1

In contrast to the aforementioned Working Example 1, five different samples $C_1$ to $C_5$ of the optical recording medium were prepared, where they had a recording layer with uniform compositional ratios of Bi and O throughout but the compositional ratios of Bi and O of the recording layer differed from one sample to another. The other features of the structure of these samples $C_1$ to $C_5$ were the same as those of samples $W_1$ to $W_5$ of the aforementioned Working Example 1. The specific structures of samples $C_1$ to $C_5$ are shown in Table 2.

TABLE 2

|  |  |  | $C_1$ | $C_2$ | $C_3$ | $C_4$ | $C_5$ |
|---|---|---|---|---|---|---|---|
| Recording layer | Compositional ratio (at %) | O | 60 | 62 | 67 | 70 | 72 |
|  |  | Bi | 40 | 38 | 33 | 30 | 28 |
|  | Gas flow (sccm) | Ar |  |  | 50 |  |  |
|  |  | $O_2$ | 10 | 12 | 15 | 20 | 25 |

TABLE 2-continued

|  | $C_1$ | $C_2$ | $C_3$ | $C_4$ | $C_5$ |
|---|---|---|---|---|---|
| Reflectivity (%) | 14.0 | 15.8 | 17.5 | 12.8 | 11.7 |
| 8T C/N value (dB) | 10.0 | 36.3 | 47.6 | 55.9 | 50.7 |

Figure 7:
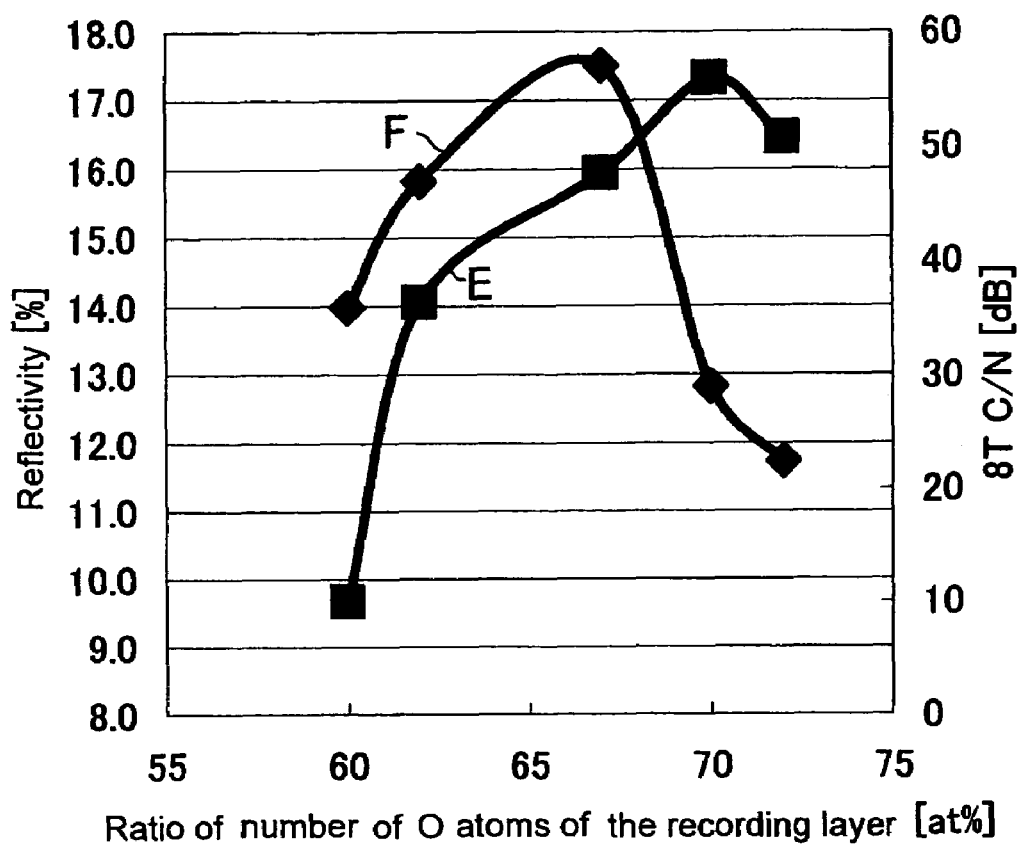
FIG. 7 is a graph showing a relationship between the reflectivity, 8T C/N values and the ratio of the number of O atoms to the total number of Bi atoms and O atoms of the recording layer for the sample in Comparative Example 1.

Likewise, the reflectivity value and the 8T C/N value were measured for each of these samples $C_1$ to $C_5$ in the same manner detailed in the aforementioned Working Example 1. The results of the measurements are shown in Table 2 and FIG. 7. It should be noted that, similarly as in FIGS. 5 and 6, FIG. 7 shows the relationship between the ratios of the number of O atoms to the total number of Bi atoms and O atoms of the recording layer and the results of the measurements of the 8T C/N values and the reflectivity values. In FIG. 7, a curve designated by reference letter E represents the results of the measurements of the 8T C/N values, and a curve designated by reference letter F represents the results of the measurements of the reflectivity values.

COMPARATIVE EXAMPLE 2

In contrast to the aforementioned Working Examples 1 and 3, two different samples $C_6$ and $C_7$ were prepared, where the ratios of the number of O atoms to the total number of Bi atoms and O atoms of the first coating portion 20 and the second coating portion 22 were 58% (i.e., less than 60%). The other features of the structure of sample $C_6$ were the same as those of samples $W_1$ to $W_5$ in the aforementioned Working Example 1, and the other features of the structure of sample $C_7$ were the same as those of samples $W_7$ to $W_{11}$ in the aforementioned Working Example 3.

Likewise, the reflectivity values and the 8T C/N values were measured for these samples $C_6$ and $C_7$ in the same manner detailed in the aforementioned Working Example 1. The structure of samples $C_6$ and $C_7$, the deposition conditions for the first coating portion 20 and the second coating portion 22, and the results of the measurements of the reflectivity values and the 8T C/N values are shown together in Table 1. Furthermore, the results of the measurement of the reflectivity value and the 8T C/N value of sample $C_6$ are shown together in FIG. 5, and the results of the measurement of the reflectivity value and the 8T C/N ratio of sample $C_7$ are shown together in FIG. 6.

In order to obtain excellent and consistent optical properties, it is preferable that values of 8T C/N and reflectivity are large. Specifically, it is preferable that the 8T C/N value is 50 dB or more. Moreover, it is preferable that the reflectivity value is 12% or more, and more preferably, 14% or more. Furthermore, in order to obtain excellent and consistent optical properties, it is preferable that changes in the values of 8T C/N and reflectivity corresponding to changes in the compositional ratios of the constituent elements of the recording layer are limited to small variations.

However, in Comparative Example 1, as shown in FIG. 7, changes in the 8T C/N value or the reflectivity value corresponding to the changes in the ratio of the number of O atoms were large, and, for example, in the range of the ratio of the number of O atoms to Bi atoms and O atoms being 67% or more, as the ratio of the number of O atoms to Bi atoms and O atoms increased, the reflectivity values decreased drastically. Moreover, the ratio of the number of O atoms to the total number of Bi atoms and O atoms at which the 8T C/N value reached a maximum was larger than the ratio of the number of O atoms at which the reflectivity reached a maximum, and this difference was significant. Furthermore, the ratio of the number of O atoms to the total number of Bi atoms and O atoms at which a large 8T C/N value of 50 dB or more was obtained was limited to a narrow range at around 70%.

Moreover, 8T C/N values of samples $C_6$ and $C_7$ of Comparative Example 2 were significantly smaller than 50.0 dB, and the reflectivity values were also smaller than 12%. That is, satisfactory results were not obtained for the reflectivity value and the 8T C/N value for samples $C_6$ and $C_7$.

In contrast to this, in Working Examples 1, 2 and 3, a reflectivity value of 12% or more and an 8T C/N value of 50.0 dB or more were obtained for all samples $W_1$ to $W_{11}$. Furthermore, as shown in FIGS. 5 and 6, in Working Examples 1 and 3, changes in the values of 8T C/N and reflectivity corresponding to the changes in the compositional ratios of the constituent elements of the first coating portion 20 and the second coating portion 22 of the recording layer 14 were limited to small variations. In Working Example 1, particularly for samples $W_2$ to $W_4$ in which the ratio of the number of O atoms to the total number of Bi atoms and O atoms of the first coating portion 20 and the second coating portion 22 was in the range of from 62% to 68%, a variation of the reflectivity values was limited to within 1% and a variation of the 8T C/N values was also limited to within 1 dB, which were considered to be excellent. Furthermore, in Working Example 3 also, for samples $W_8$ to $W_{10}$ in which the ratio of the number of O to the total number of Bi and O in the first coating portion 20 and the second coating portion 22 was in the range of from 62% to 68%, a variation of the reflectivity values was limited to within 1% and a variation of the 8T C/N values was limited to within 3 dB, which were considered to be excellent.

The reason for this is considered to be that the first coating portion 20 and the second coating portion 22 where the ratio of the number of O atoms is relatively small contribute to the reflectivity value, and the recording portion 18 where the ratio of the number of O atoms is relatively large contributes to the 8T C/N value, thereby realizing an excellent 8T C/N value and an excellent reflectivity value simultaneously.

It should be noted that, as shown by the data of sample $C_6$ in FIG. 5 and that of sample $C_7$ in FIG. 6, if the ratio of the number of o atoms to the total number of Bi atoms and O atoms of the first coating portion 20 and the second coating portion 22 is smaller than 60%, then the 8T C/N values tend to decrease significantly. However, if the ratio of the number of O atoms to the total number of Bi atoms and O atoms of the first coating portion 20 and the second coating portion 22 is in the range of from 60% to 70%, then changes in the 8T C/N values and changes in the reflectivity values corresponding to the changes in the compositional ratios of the constituent elements of the first coating portion 20 and the second coating portion 22 of the recording layer 14 are both limited to small variations. In particular, if the ratio of the number of O atoms to the total number of Bi atoms and O atoms of the first coating portion 20 and the second coating portion 22 is 62% or more, then changes in the 8T C/N values and changes in the reflectivity values corresponding to the changes in the compositional ratios of the constituent elements of the first coating portion 20 and the second coating portion 22 of the recording layer 14 are both limited to small variations.

It should be noted that, as shown by the curve E in FIG. 7, if the ratio of the number of O atoms to the total number of Bi atoms and O atoms is less than 62%, then the 8T C/N value of the recording layer made substantially from Bi and O tends to become significantly small. Furthermore, it is difficult to manufacture a recording layer where the ratio of the number of O to the total number of Bi and O is greater than 77%. Therefore, it is considered to be satisfactory that the ratio of the number of O atoms to the total number of Bi atoms and O atoms of the recording portion 18, which is considered to be contributing mainly to the 8T C/N value, is in the range of from 62% to 77%.

The present invention can be used to an optical recording medium where optical properties of the recording layer change to record data when irradiated with a blue or blue-violet laser beam.

What is claimed is:

1. An optical recording medium comprising:
   a substrate; and
   a recording layer formed over the substrate, wherein:
   the recording layer includes a recording portion, and a coating portion which coats at least one side of the recording portion in a direction of thickness;
   the recording portion and the coating portion are both made substantially from Bi and O;
   a ratio of number of O atoms to a total number of Bi atoms and O atoms of the coating portion is less than that of the recording portion;
   a ratio of number of O atoms to a total number of Bi atoms and O atoms of the recording portion is in a range of from 62% to 77%; and
   the ratio of the number of O atoms to the total number of Bi atoms and O atoms of the coating portion is in a range of from 60% to 65%.

2. The optical recording medium according to claim 1, wherein
   the ratio of the number of O atoms to the total number of Bi atoms and O atoms of the coating portion is in a range of from 62% to 65%.

3. The optical recording medium according to claim 1, wherein
   the recording layer is configured such that the coating portion is provided on both sides of the recording portion in the direction of thickness.

4. The optical recording medium according to claim 2, wherein
   the recording layer is configured such that the coating portion is provided on both sides of the recording portion in the direction of thickness.

5. The optical recording medium according to claim 1, wherein
   a laser beam of a wavelength in a range of from 380 nm to 450 nm is irradiated for recording/reproducing data.

6. The optical recording medium according to claim 2, wherein
   a laser beam of a wavelength in a range of from 380 nm to 450 nm is irradiated for recording/reproducing data.

7. The optical recording medium according to claim 3, wherein
   a laser beam of a wavelength in a range of from 380 nm to 450 nm is irradiated for recording/reproducing data.

8. The optical recording medium according to claim 4, wherein
   a laser beam of a wavelength in a range of from 380 nm to 450 nm is irradiated for recording/reproducing data.

* * * * *